United States Patent
Chen et al.

(10) Patent No.: US 9,477,365 B2
(45) Date of Patent: Oct. 25, 2016

(54) TOUCH DISPLAY DEVICE HAVING AUXILIARY CAPACITOR

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW); Chih-Wen Wu, Taipei (TW); Jen-Chieh Chang, Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 13 days.

(21) Appl. No.: 14/688,225

(22) Filed: Apr. 16, 2015

(65) Prior Publication Data

US 2015/0301654 A1   Oct. 22, 2015

(30) Foreign Application Priority Data

Apr. 22, 2014   (TW) .............................. 103114573 A (51) Int. Cl.
| | | |
|---|---|---|
| *G06F 3/041* | (2006.01) | |
| *G06F 3/044* | (2006.01) | |
| *G09G 5/00* | (2006.01) | |
| *G09G 3/32* | (2016.01) | |
| *G06F 3/0488* | (2013.01) | |

(52) U.S. Cl.
CPC .............. *G06F 3/044* (2013.01); *G06F 3/0412* (2013.01); *G06F 3/0416* (2013.01); *G06F 3/04886* (2013.01); *G09G 3/3208* (2013.01); *G09G 5/003* (2013.01); *G09G 2300/04* (2013.01)

(58) Field of Classification Search
CPC .... G06F 3/044; G06F 3/0412; G06F 3/0418; G06F 3/0416; G06F 2203/04104; G06F 2203/04107; G06F 2203/04103; G06F 3/041; G06F 3/047
USPC .................................................. 345/173–181
See application file for complete search history.

(56) References Cited

U.S. PATENT DOCUMENTS

| | | | |
|---|---|---|---|
| 7,705,834 B2 | 4/2010 | Swedin | |
| 8,537,126 B2* | 9/2013 | Yousefpor | G06F 3/0416 345/173 |
| 2013/0176251 A1* | 7/2013 | Wyatt | G09G 5/18 345/173 |
| 2013/0285952 A1* | 10/2013 | Huang | G09G 3/3611 345/173 |

* cited by examiner

*Primary Examiner* — Duc Dinh
(74) *Attorney, Agent, or Firm* — Muncy, Geissler, Olds & Lowe, P.C.

(57) ABSTRACT

A touch display device having auxiliary capacitor, including: at least one touch operation area, each having two opposing substrates, between which are a first electrode, a first conductive line coupled with the first electrode, a second electrode, a second conductive line coupled with the second electrode, and a display layer neighboring both the first electrode and the second electrode; a display driver unit for outputting at least one display driving voltage; a touch detection unit having at least one touch signal sensing port; at least one auxiliary capacitor, each coupled with one of the at least one touch operation area; and at least one switch element; wherein, each of the at least one display driving voltage is coupled to one of the at least one touch operation area via one of the at least one switch element.

14 Claims, 10 Drawing Sheets

(PRIOR ART)

TOUCH DISPLAY DEVICE HAVING AUXILIARY CAPACITOR

BACKGROUND OF THE INVENTION

1. Field of the Invention

The present invention relates to a touch display device, particularly to a touch display device having auxiliary capacitor.

2. Description of the Related Art

General touch display devices have a touch module stacked on a screen, causing the depth thereof not slim enough to meet the market's requirement. Besides, this structure also has room for cost reduction.

To solve the problems, one solution is to make a same material layer shared by the screen and the touch module. However, the resultant depth of the touch display device is still not slim enough to meet the requirement of some high end products.

Figure 1:
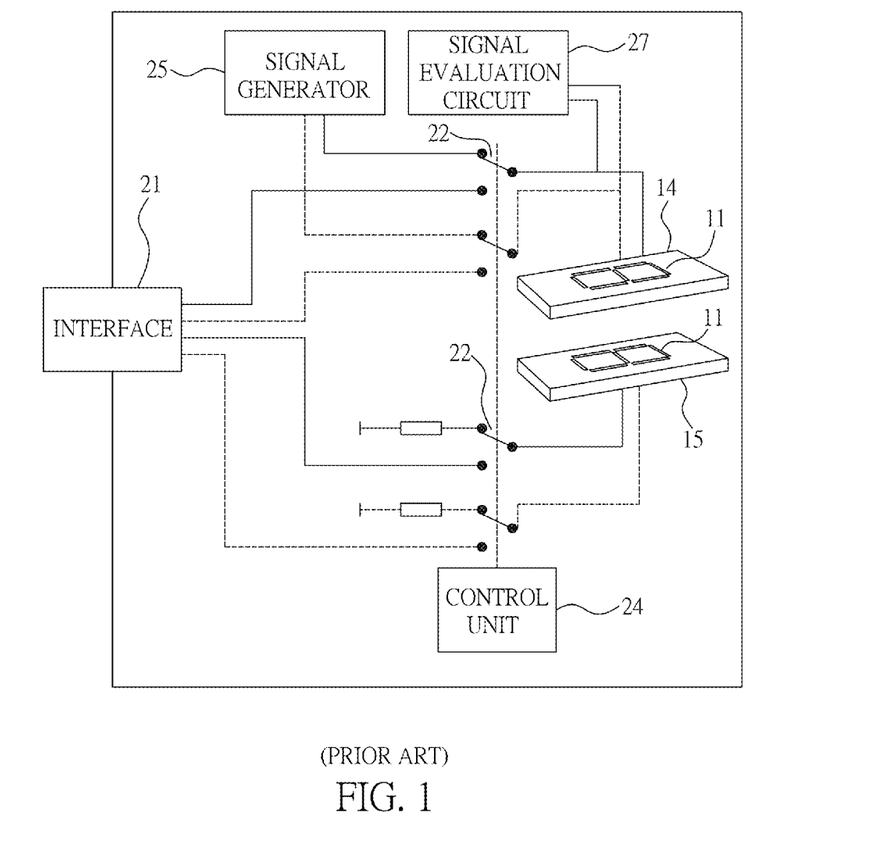
FIG. 1 illustrates a prior art touch display device.

Another solution is to implement a touch function directly on a display device. Please refer to FIG. 1, which illustrates a prior art touch display device. As illustrated in FIG. 1, the prior art touch display device mainly includes two opposing electrode substrates 14, 15, an interface 21, multiple switches 22, a control unit 24, a signal generator 25, and a signal evaluation circuit 27.

The electrode substrates 14 and 15 each have multiple display electrodes 11, and each of the multiple display electrodes 11 of the electrode substrates 14 opposes one of the multiple display electrodes 11 of the electrode substrates 15.

The interface 21 is used to couple with a conventional display driving controller (not shown in the figure).

The multiple switches 22 are used to connect the electrode substrates 14, 15 with the interface 21 to provide a display function, or with the signal generator 25 to provide a touch function. When the electrode substrates 14, 15 provide the touch function, the signal generator 25 will output a test signal and the signal evaluation circuit 27 will detect a change of the test signal to determine if a touch event occurs.

However, although the active time of the touch function is set to not overlapping with the active time of the display function, the average display brightness thereof will decrease and the display image will tend to have flicker phenomenon (especially when the display device is implemented by OLED (organic light emitting diode) or PLED (polymer light emitting diode), both OLED and PLED requiring electric current to maintain light emitting, the display image will be blacked out when the electric current is interrupted.)

To solve the foregoing problems, a novel touch display device is needed.

SUMMARY OF THE INVENTION

One objective of the present invention is to disclose a touch display device capable of providing a touch function without interrupting a display image by adding at least one auxiliary capacitor and at least one switch element in a display circuit of a display device.

Another objective of the present invention is to disclose a touch display device capable of directly using a surface of a display device as a touch surface without the need of stacking a touch module on the display device.

Another objective of the present invention is to disclose a touch display device capable of using at least one switch element to switch off a current path between a touch detection circuit and a display driver unit, so as to provide a touch function directly on at least one surface of a display device.

Still another objective of the present invention is to disclose a touch display device capable of using at least one auxiliary capacitor to provide electric energy to a display area when the display area is isolated from a display driving unit.

To attain the foregoing objectives, a touch display device having auxiliary capacitor is proposed, including:

at least one touch operation area, each having two opposing substrates for providing at least one touch surface, wherein, a first electrode, a first conductive line coupled with the first electrode, a second electrode, a second conductive line coupled with the second electrode, and a display layer neighboring both the first electrode and the second electrode are located between the two opposing substrates; and the at least one touch surface covers at least one touch sensing element, the touch sensing element being selected from a group consisting of the first electrode, the second electrode, the first conductive line, and the second conductive line;

a display driver unit for outputting at least one display driving voltage to the at least one touch operation area;

a touch detection unit having at least one touch signal sensing port, wherein each of the at least one touch signal sensing port is coupled with one surface of the at least one touch surface or with two surfaces of the at least one touch surface;

at least one auxiliary capacitor, each having two connection ends coupled respectively with the first conductive line and the second conductive line of one of the at least one touch operation area; and at least one switch element;

wherein, each of the at least one display driving voltage is coupled to one of the at least one touch operation area via one of the at least one switch element, and when the touch detection unit performs a touch detection procedure, at least one of the at least one switch element will be switched off.

In one embodiment, the display layer is selected from a group consisting of OLED display layer, PLED display layer, liquid crystal display layer, and electronic paper display layer, and the display layer is located below the first electrode and above the second electrode, or above both the first electrode and the second electrode.

In one embodiment, the touch detection procedure is selected from a group consisting of self-capacitor touch detection procedure and mutual-capacitor touch detection procedure.

In one embodiment, when the touch detection unit performs the touch detection procedure, at least one of the at least one switch element will be switched on to disable at least one of the at least one touch operation area.

To attain the foregoing objectives, another touch display device having auxiliary capacitor is proposed, including:

at least one touch operation area, each having two opposing substrates for providing at least one touch surface, wherein, a first electrode, a first conductive line coupled with the first electrode, a second electrode, a second conductive line coupled with the second electrode, and a display layer neighboring both the first electrode and the second electrode are located between the two opposing substrates; and the at least one touch surface covers at least one touch sensing element, the touch sensing element being selected from a group consisting of the first electrode, the second electrode, the first conductive line, and the second conductive line;

a display driver unit for outputting at least one display driving voltage to the at least one touch operation area;

a touch detection unit having at least one touch signal sensing port, wherein each of the at least one touch signal sensing port is coupled with one surface of the at least one touch surface or with two surfaces of the at least one touch surface;

at least one auxiliary capacitor, each having two connection ends coupled respectively with the first conductive line and the second conductive line of one of the at least one touch operation area; and at least one pair of switch elements;

wherein, each of the at least one display driving voltage is coupled to one of the at least one touch operation area via one pair of the switch elements, and when the touch detection unit performs a touch detection procedure, at least one pair of the switch elements will be switched off.

In one embodiment, the display layer is selected from a group consisting of OLED display layer, PLED display layer, liquid crystal display layer, and electronic paper display layer, and the display layer is located below the first electrode and above the second electrode, or above both the first electrode and the second electrode.

In one embodiment, the touch detection procedure is selected from a group consisting of self-capacitor touch detection procedure and mutual-capacitor touch detection procedure.

In one embodiment, when the touch detection unit performs the touch detection procedure, at least one pair of the switch elements will be switched on to disable at least one of the at least one touch operation area.

To attain the foregoing objectives, still another touch display device having auxiliary capacitor is proposed, including:

at least one touch operation area, each having two opposing substrates for providing at least one touch surface, wherein, a first transistor, a first electrode, a first conductive line coupled with the first electrode, a second electrode, a second conductive line coupled with the second electrode, an auxiliary capacitor, a display layer neighboring both the first electrode and the second electrode, and a second transistor are located between the two opposing substrates, wherein the first transistor has a gate for coupling with a gate driving signal, a drain for coupling with a display driving signal and a touch signal, and a source for coupling with the first electrode; the second transistor has a gate for coupling with a switch signal, a drain for coupling with the second electrode, and a source for coupling with a ground; and the auxiliary capacitor is coupled between the first electrode and the second electrode;

a display driver unit for generating the gate driving signal and the display driving signal; and a touch detection unit for generating the switch signal and the touch signal, wherein, when the touch detection unit performs a touch detection procedure, the switch signal for at least one of the at least one touch operation area will exhibit a switch-off voltage to switch off the second transistor thereof.

In one embodiment, the drain of the first transistor is coupled with the display driving signal and the touch signal via a switch element.

In one embodiment, the drain of the first transistor is coupled with a data line auxiliary capacitor.

In one embodiment, the display layer is selected from a group consisting of OLED display layer, PLED display layer, liquid crystal display layer, and electronic paper display layer, and the display layer is located below the first electrode and above the second electrode, or above both the first electrode and the second electrode.

In one embodiment, the touch detection procedure is selected from a group consisting of self-capacitor touch detection procedure and mutual-capacitor touch detection procedure.

In one embodiment, when the touch detection unit performs the touch detection procedure, the second transistor of at least one of the at least one touch operation area will be switched on to disable a touch operation area thereof.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 4a-4b illustrates a user performing a touch operation on a touch operation area of the touch display device of FIG. 2 when a corresponding switch element is switched on.

DETAILED DESCRIPTION OF THE PREFERRED EMBODIMENTS

The present invention will be described in more detail hereinafter with reference to the accompanying drawings that show the preferred embodiments of the invention.

Figure 2:
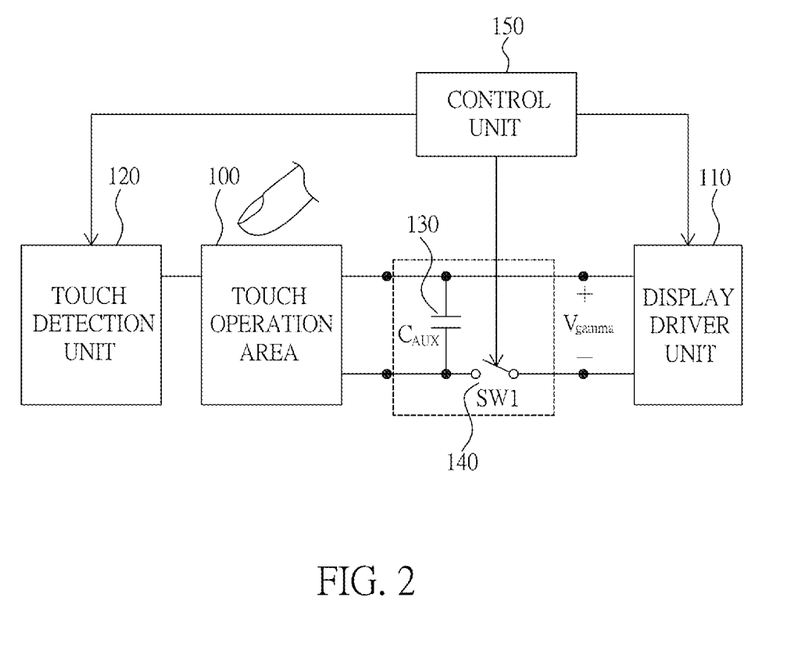
FIG. 2 illustrates a block diagram of a touch display device having auxiliary capacitor according to a preferred embodiment of the present invention.

Please refer to FIG. 2, which illustrates a block diagram of a touch display device having auxiliary capacitor according to a preferred embodiment of the present invention. As illustrated in FIG. 2, the touch display device includes at least one touch operation area 100, a display driver unit 110, a touch detection unit 120, at least one auxiliary capacitor 130, at least one switch element 140, and a control unit 150.

Figure 3A:
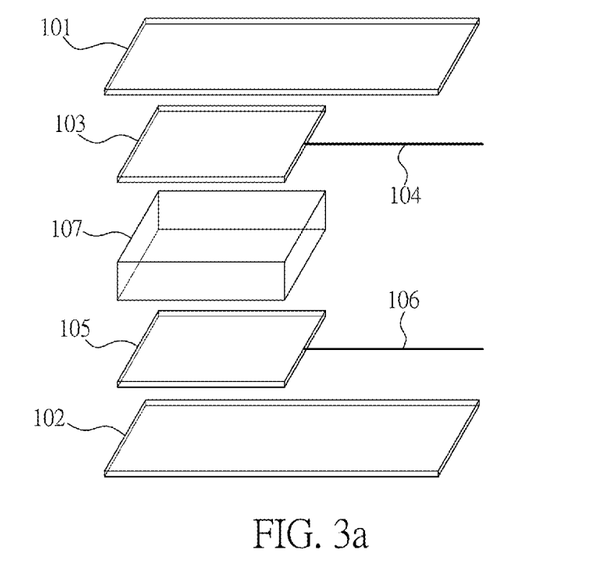
FIG. 3a illustrates a structure of a touch operation area of the touch display device of FIG. 2.
Figure 3B:
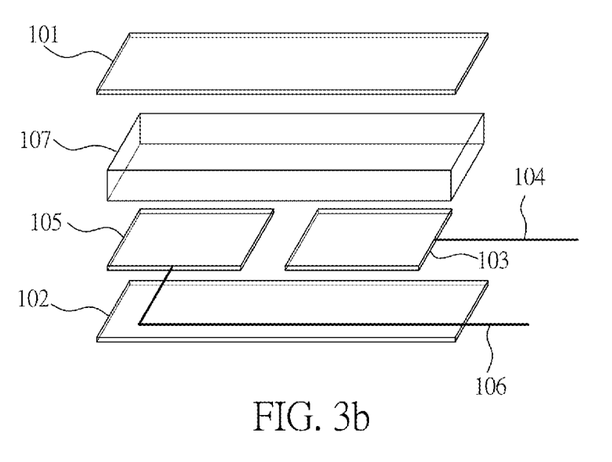
FIG. 3b illustrates another structure of a touch operation area of the touch display device of FIG. 2.

The structure of the touch operation area 100 is illustrated in FIG. 3a-3b. As illustrated in FIG. 3a-3b, the touch operation area 100 has two opposing substrates 101, 102 for providing at least one touch surface for a user to perform touch operation, wherein, a first electrode 103, a first conductive line 104 coupled with the first electrode 103, a second electrode 105, a second conductive line 106 coupled with the second electrode 105, and a display layer 107 neighboring both the first electrode 103 and the second electrode 105 are located between the two opposing substrates 101, 102; and the touch surface covers at least one touch sensing element, the touch sensing element being selected from a group consisting of the first electrode 103, the second electrode 105, the first conductive line 104, and the second conductive line 106. That is, either of the first electrode 103, the second electrode 105, the first conductive line 104, and the second conductive line 106 can serve as a touch sensing element.

The substrates 101, 102 are implemented by a transparent material—for example but not limited to, glass or plastics. Besides, the display layer 107 can be an OLED display layer, a PLED display layer, a liquid crystal display layer, or an electronic paper display layer, and the display layer 107 can be located below the first electrode 103 and above the second electrode 105 (as illustrated in FIG. 3a), or above both the first electrode 103 and the second electrode 105 (as illustrated in FIG. 3b).

The display driver unit 110 is used for outputting at least one display driving voltage $V_{gamma}$ to the at least one touch operation area 100.

The touch detection unit 120 has at least one touch signal sensing port, wherein each of the at least one touch signal sensing port is coupled with one surface of the at least one touch surface or with two surfaces of the at least one touch surface.

The auxiliary capacitor 130 has two connection ends coupled respectively with the first conductive line 104 and the second conductive line 106 of one of the at least one touch operation area 100.

In the touch display device, each of the at least one display driving voltage $V_{gamma}$ is coupled to one of the at least one touch operation area 100 via one of the at least one switch element 140, which can be realized by at least one transistor, and when the touch detection unit 120 performs a touch detection procedure, at least one of the at least one switch element 140 will be switched off, and the touch detection procedure can be a self-capacitor touch detection procedure or a mutual-capacitor touch detection procedure. Besides, when the touch detection unit 120 performs the touch detection procedure on a touch operation area 100, the electric energy stored in the auxiliary capacitor 130 can be used to sustain a display status of the display layer 107, thereby providing a stable display image.

Figure 4A:
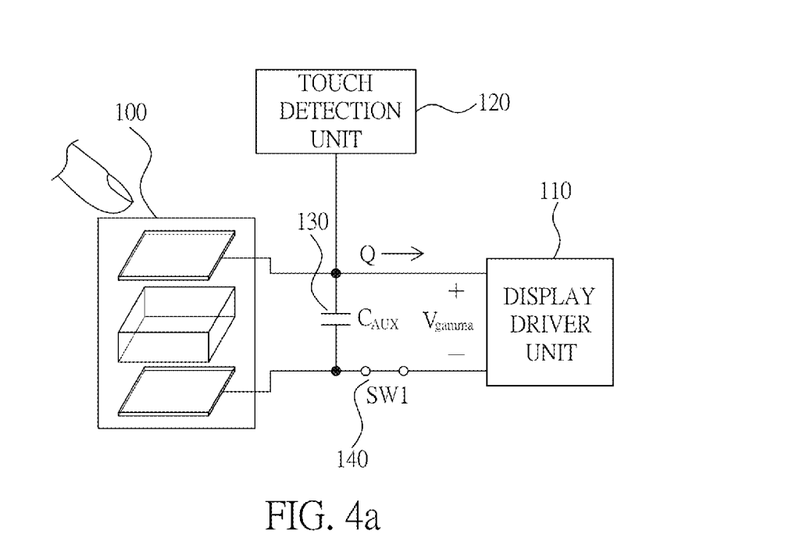
Figure 4B:
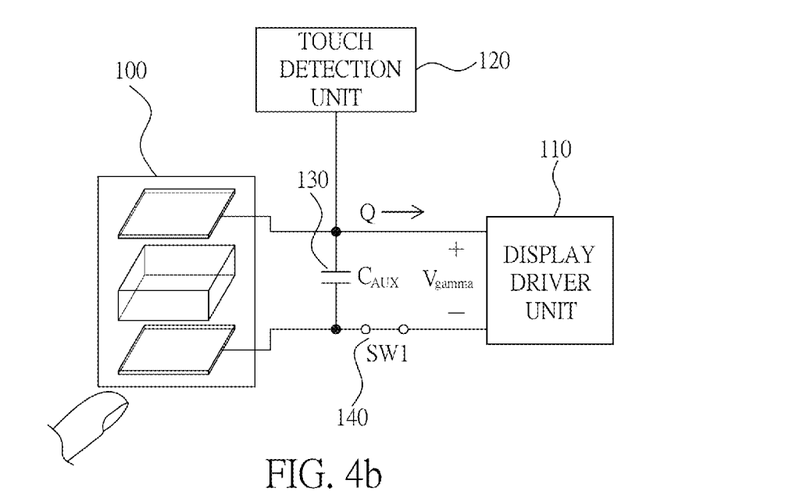
Figure 4C:
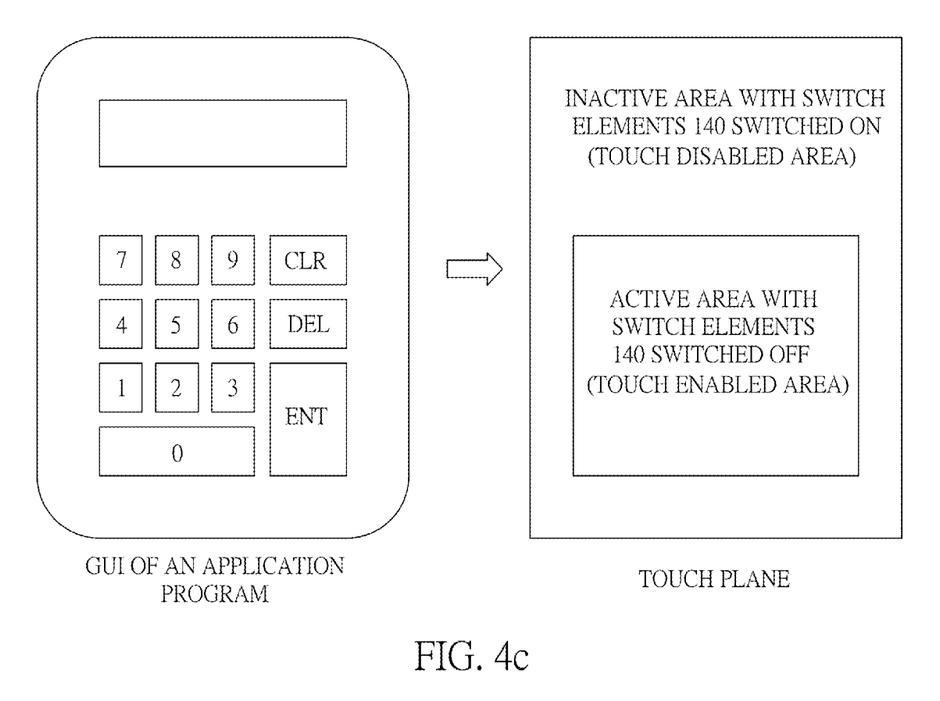
FIG. 4c illustrates an application of the present invention.

The control unit 150 is used to control the operation timings of the display driver unit 110, the touch detection unit 120, and the at least one switch element 140, wherein, a corresponding switch element 140 will be switched off after the display driver unit 110 completing a pixel voltage write-in process on a touch operation area 100, so that the touch detection unit 120 can get valid touch signal values from the touch operation area 100. In other words, the touch detection unit 120 will not get valid touch signal values from the touch operation area 100 with the switch element 140 switched on. Please refer to FIG. 4a-4b, which illustrates a user performing a touch operation on a touch operation area 100 when a corresponding switch element 140 is switched on. As illustrated in FIG. 4a-4b, when the switch element 140 is switched on, as the display driver unit 110 has a low output resistance, there will be more charges Q flowing to the display driver unit 110 and therefore preventing the touch detection unit 120 from getting valid touch signal values. That is, by switching on/off a switch element 140, the present invention is capable of enabling/disabling a touch operation area 100. With the ignorable touch operation areas 100 disabled, the noise in touch signals can be reduced effectively, thereby increasing the reliability of touch detection. Please refer to FIG. 4c, which illustrates an application of the present invention. As illustrated in FIG. 4c, when the present invention is applied to a GUI (graphics user interface) of an application program, multiple switch elements 140 in an active area can be switched off to enable the touch operation on the active area, and multiple switch elements 140 in an inactive area can be switched on to disable the touch operation on the inactive area. As a result, the present invention can reduce detection points and prevent the inactive region from generating noise to interfere with the active region, thereby promoting the efficiency and reliability of touch detection. Besides, the operation timing of the at least one switch element 140 is not necessarily controlled by the control unit 150, but can also be controlled by the display driver unit 110 or the touch detection unit 120.

Figure 5:
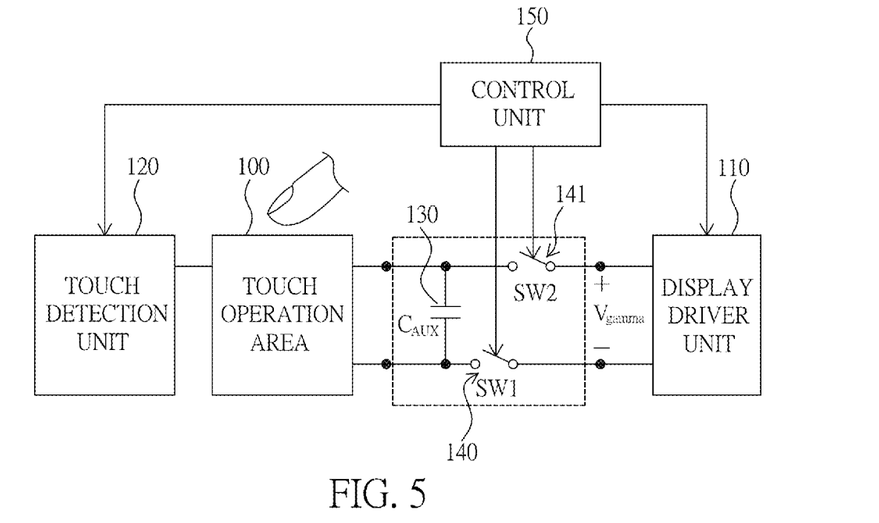
FIG. 5 illustrates a block diagram of a touch display device having auxiliary capacitor according to another preferred embodiment of the present invention.

Please refer to FIG. 5, which illustrates a block diagram of a touch display device having auxiliary capacitor according to another preferred embodiment of the present invention. As illustrated in FIG. 5, the touch display device includes at least one touch operation area 100, a display driver unit 110, a touch detection unit 120, at least one auxiliary capacitor 130, at least one pair of switch elements (140, 141), and a control unit 150.

The structure of the touch operation area 100 is illustrated in FIG. 3a-3b. As illustrated in FIG. 3a-3b, the touch operation area 100 has two opposing substrates 101, 102 for providing at least one touch surface for a user to perform touch operation, wherein, a first electrode 103, a first conductive line 104 coupled with the first electrode 103, a second electrode 105, a second conductive line 106 coupled with the second electrode 105, and a display layer 107 neighboring both the first electrode 103 and the second electrode 105 are located between the two opposing substrates 101, 102; and the touch surface covers at least one touch sensing element, the touch sensing element being selected from a group consisting of the first electrode 103, the second electrode 105, the first conductive line 104, and the second conductive line 106.

The display driver unit 110 is used for outputting at least one display driving voltage $V_{gamma}$ to the at least one touch operation area 100.

The touch detection unit 120 has at least one touch signal sensing port, wherein each of the at least one touch signal sensing port is coupled with one surface of the at least one touch surface or with two surfaces of the at least one touch surface.

The auxiliary capacitor 130 has two connection ends coupled respectively with the first conductive line 104 and the second conductive line 106 of one of the at least one touch operation area 100.

In the touch display device, each of the at least one display driving voltage $V_{gamma}$ is coupled to one of the at least one touch operation area 100 via one pair of the switch elements (140, 141), and when the touch detection unit 120 performs a touch detection procedure, at least one pair of the switch elements (140, 141) will be switched off.

Compared with the touch display device of FIG. 2, the touch display device of FIG. 5 has added in at least one switch element 141, with an aim to further reduce the charge loss of the touch operation area 100 during a touch detection procedure, so as to improve the touch reliability. The switch elements 140, 141 can be realized by transistors, and the switch element 141 can also be realized by a diode.

Figure 6:
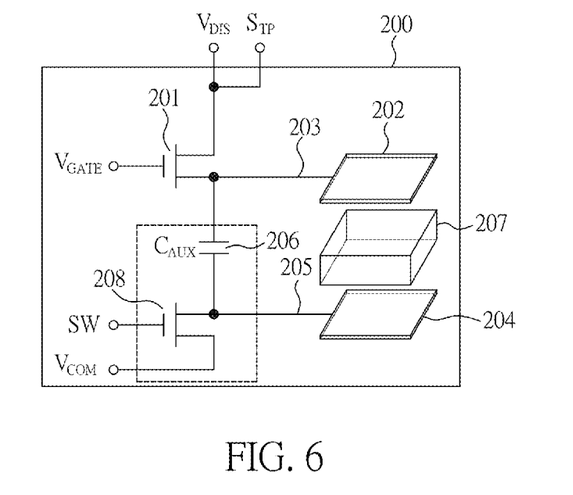
FIG. 6 illustrates a touch display device having auxiliary capacitor according to another preferred embodiment of the present invention.

The touch display device of the present invention can also be applied to active type display devices. Please refer to FIG. 6, which illustrates a touch display device having auxiliary capacitor according to another preferred embodiment of the present invention. As illustrated in FIG. 6, the touch display device includes at least one touch operation area 200, a display driver unit 210, and a touch detection unit 220.

The touch operation area 200 has two opposing substrates (not shown in the figure) for providing at least one touch surface, wherein, a first transistor 201, a first electrode 202, a first conductive line 203 coupled with the first electrode 202, a second electrode 204, a second conductive line 205 coupled with the second electrode 204, an auxiliary capacitor 206, a display layer 207 neighboring both the first electrode 202 and the second electrode 204, and a second transistor 208 are located between the two opposing substrates; wherein the first transistor 201 has a gate for coupling with a gate driving signal $V_{GATE}$, a drain for coupling with a display driving signal $V_{DIS}$ and a touch signal $S_{TP}$, and a source for coupling with the first electrode 202; the second transistor 208 has a gate for coupling with a switch signal SW, a drain for coupling with the second electrode 208, and a source for coupling with a ground $V_{COM}$; and the auxiliary capacitor 206 is coupled between the first electrode 202 and the second electrode 204.

The display driver unit 210 is used for generating the gate driving signal $V_{GATE}$ and the display driving signal $V_{DIS}$.

The touch detection unit 220 is used for generating the switch signal SW and the touch signal $S_{TP}$, wherein, when the touch detection unit 220 performs a touch detection procedure, the switch signal SW will exhibit a switch-off voltage to switch off the second transistor 208.

Figure 7:
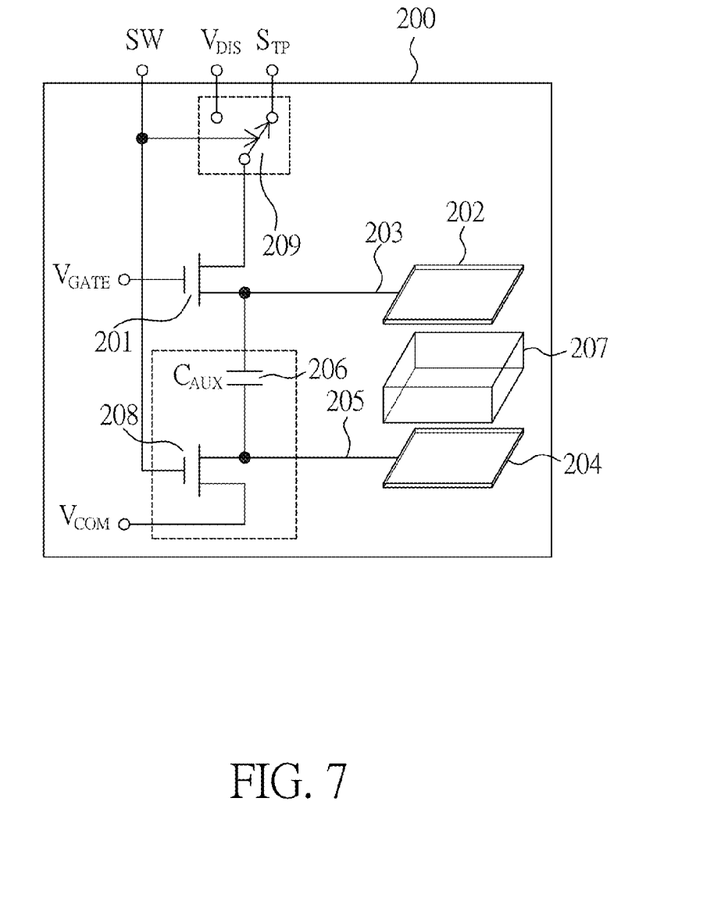
FIG. 7 illustrates a touch display device having auxiliary capacitor according to another preferred embodiment of the present invention.

To further improve the reliability of touch detection, the drain of the first transistor 201 can be coupled with the display driving signal $V_{DIS}$ and the touch signal $S_{TP}$ via the control of a switch element. Please refer to FIG. 7, which illustrates a touch display device having auxiliary capacitor according to another preferred embodiment of the present invention. As can be seen in FIG. 7, the touch display device thereof, in comparison with that of FIG. 6, additionally includes a switch element 209, which can further reduce the charge loss of the touch operation area 200 and thereby improve the reliability of touch detection.

Figure 8:
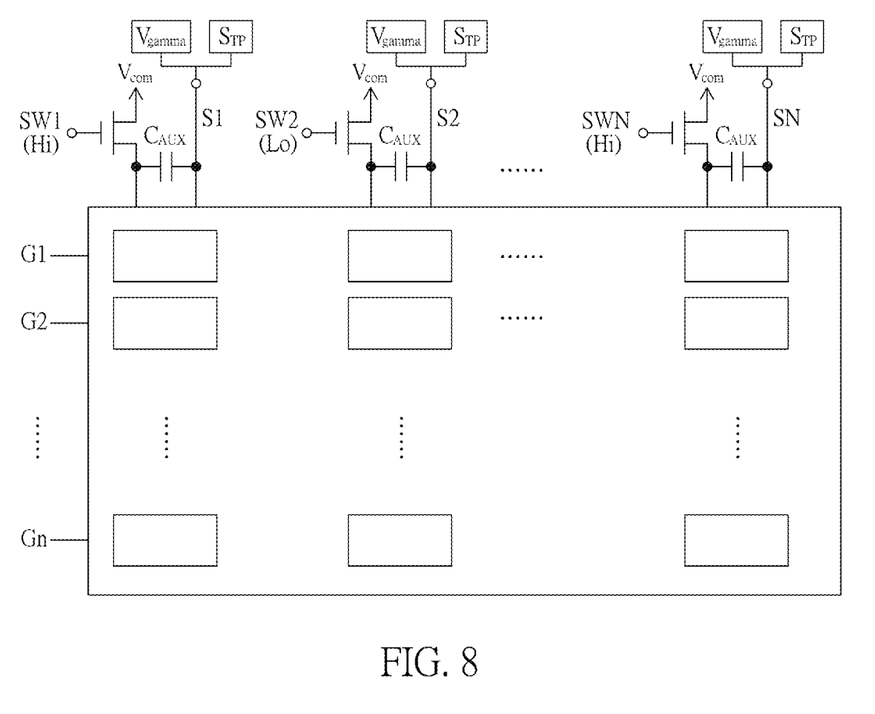
FIG. 8 illustrates a touch display device having auxiliary capacitor according to another preferred embodiment of the present invention.

Besides, the auxiliary capacitor of the present invention can also be placed at the data lines of an active type display device. Please refer to FIG. 8, which illustrates a touch display device having auxiliary capacitor according to another preferred embodiment of the present invention. As can be seen in FIG. 8, a data line auxiliary capacitor $C_{AUX}$ is placed at each of the N data lines S1-SN of the touch display device. When a switch signal (SW2, for example) exhibits a low voltage to enable the touch detection on multiple pixels of a data line (S2, for example), the data line auxiliary capacitor $C_{AUX}$ thereof can provide electric energy for the multiple pixels of the data line (S2) to sustain a display status.

Figure 9A:
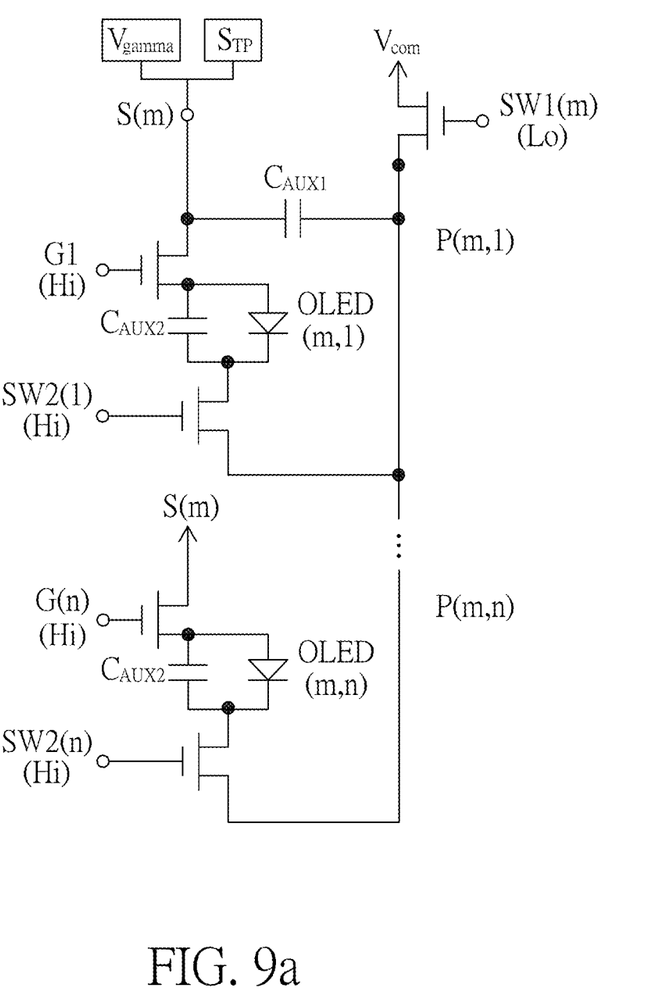
FIG. 9a-9b illustrates a touch display device having auxiliary capacitor according to still another preferred embodiment of the present invention.
Figure 9B:
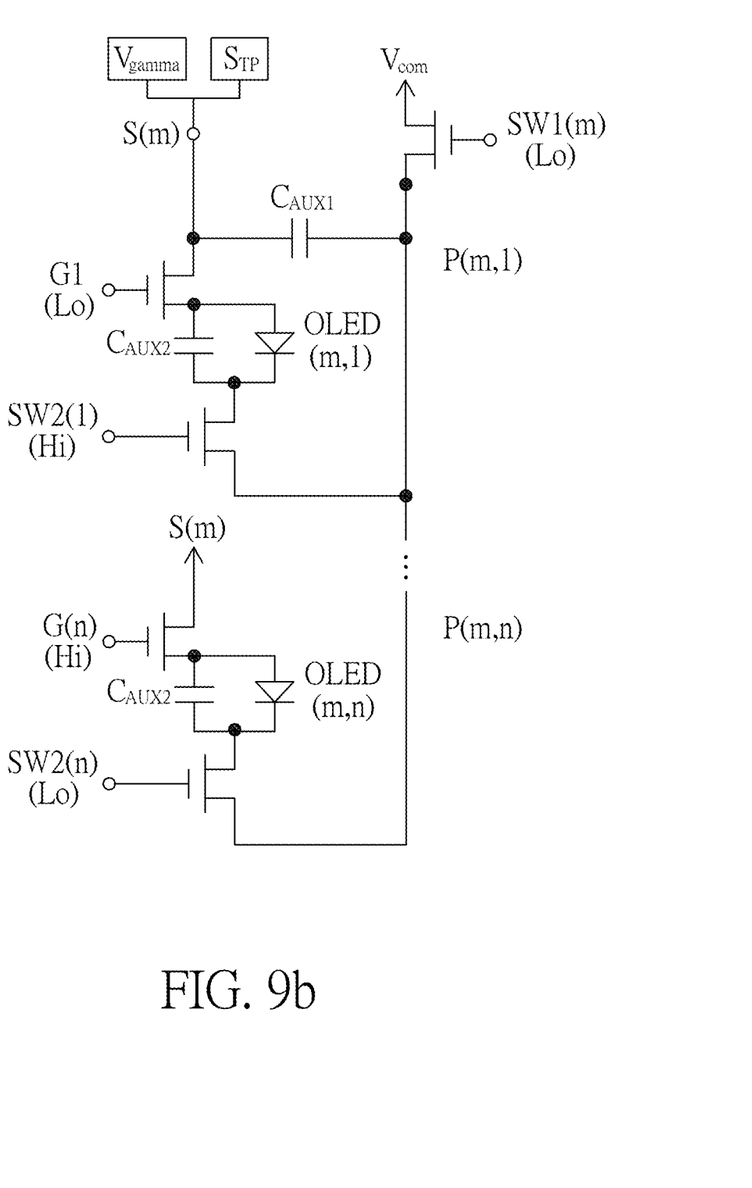

Besides, the auxiliary capacitor of the present invention can also be placed at the data lines and pixels of an active type display device. Please refer to FIG. 9a-9b, which illustrates a touch display device having auxiliary capacitor according to still another preferred embodiment of the present invention. As can be seen in FIG. 9a, a data line auxiliary capacitor $C_{AUX1}$ and a first switch element (controlled by SW1(m)) are equipped for a data line S(m) of the touch display device, and each pixel P(m, i) thereof, i=1 through n, is made of OLED and equipped with a pixel auxiliary capacitor $C_{AUX2}$ and a second switch element (controlled by SW2(i)). When the SW1(m) exhibits a low voltage to enable the touch detection on a line of the multiple pixels P(m, i), i=1 through n, the data line auxiliary capacitor $C_{AUX1}$ and the multiple pixel auxiliary capacitors $C_{AUX2}$ thereof can provide electric energy for the multiple pixels of the data line S(m) to sustain a display status. In addition to the touch detection on a line, the structure of FIG. 9a can further allow touch detection on a point. As can be seen in FIG. 9b, by making the SW1(m) exhibiting a low voltage level, G(1)-G(n-1) all exhibiting a low voltage level, G(n) exhibiting a high voltage level, SW2(1)-SW2(n-1) all exhibiting a high voltage level, and SW2(n) exhibiting a low voltage level, the touch detection on the pixel P(m, n) is enabled, and the multiple pixel auxiliary capacitors $C_{AUX2}$ thereof can provide electric energy for the multiple pixels of the data line S(m) to sustain a display status.

Thanks to the novel designs disclosed above, the present invention possesses the following advantages:

1. The touch display device of the present invention is capable of providing a touch function without interrupting a display image by adding at least one auxiliary capacitor and at least one switch element in a display circuit of a display device.

2. The touch display device of the present invention is capable of using at least one auxiliary capacitor to provide electric energy to a display area when the display area is isolated from a display driving unit.

3. The touch display device of the present invention is capable of directly using a surface of a display device as a touch surface without the need of stacking a touch module on the display device.

4. The touch display device of the present invention is capable of using at least one switch element to switch off a current path between a touch detection circuit and a display driver unit, so as to provide a touch function directly on at least one surface of a display device.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch display device having auxiliary capacitor, comprising:
    at least one touch operation area, each having two opposing substrates for providing at least one touch surface, wherein, a first electrode, a first conductive line coupled with said first electrode, a second electrode, a second conductive line coupled with said second electrode, and a display layer neighboring both said first electrode and said second electrode are located between said two opposing substrates; and said at least one touch surface covers at least one touch sensing element, said touch sensing element being selected from a group consisting of said first electrode, said second electrode, said first conductive line, and said second conductive line;
    a display driver unit for outputting at least one display driving voltage to said at least one touch operation area;
    a touch detection unit having at least one touch signal sensing port, wherein each of said at least one touch signal sensing port is coupled with one surface of said at least one touch surface or with two surfaces of said at least one touch surface;

at least one auxiliary capacitor, each having two connection ends coupled respectively with said first conductive line and said second conductive line of one of said at least one touch operation area; and at least one switch element;

wherein, each of said at least one display driving voltage is coupled to one of said at least one touch operation area via one of said at least one switch element, and when said touch detection unit performs a touch detection procedure, at least one of said at least one switch element will be switched off.

2. The touch display device having auxiliary capacitor as disclosed in claim 1, wherein said display layer is selected from a group consisting of OLED display layer, PLED display layer, liquid crystal display layer, and electronic paper display layer, and said display layer is located below said first electrode and above said second electrode, or above both said first electrode and said second electrode.

3. The touch display device having auxiliary capacitor as disclosed in claim 1, wherein said touch detection procedure is selected from a group consisting of self-capacitor touch detection procedure and mutual-capacitor touch detection procedure.

4. The touch display device having auxiliary capacitor as disclosed in claim 1, wherein when said touch detection unit performs said touch detection procedure, at least one of said at least one switch element will be switched on to disable at least one of said at least one touch operation area.

5. A touch display device having auxiliary capacitor, comprising:

at least one touch operation area, each having two opposing substrates for providing at least one touch surface, wherein, a first electrode, a first conductive line coupled with said first electrode, a second electrode, a second conductive line coupled with said second electrode, and a display layer neighboring both said first electrode and said second electrode are located between said two opposing substrates; and said at least one touch surface covers at least one touch sensing element, said touch sensing element being selected from a group consisting of said first electrode, said second electrode, said first conductive line, and said second conductive line;

a display driver unit for outputting at least one display driving voltage to said at least one touch operation area;

a touch detection unit having at least one touch signal sensing port, wherein each of said at least one touch signal sensing port is coupled with one surface of said at least one touch surface or with two surfaces of said at least one touch surface;

at least one auxiliary capacitor, each having two connection ends coupled respectively with said first conductive line and said second conductive line of one of said at least one touch operation area; and at least one pair of switch elements;

wherein, each of said at least one display driving voltage is coupled to one of said at least one touch operation area via one pair of said switch elements, and when said touch detection unit performs a touch detection procedure, at least one pair of said switch elements will be switched off.

6. The touch display device having auxiliary capacitor as disclosed in claim 5, wherein said display layer is selected from a group consisting of OLED display layer, PLED display layer, liquid crystal display layer, and electronic paper display layer, and said display layer is located below said first electrode and above said second electrode, or above both said first electrode and said second electrode.

7. The touch display device having auxiliary capacitor as disclosed in claim 5, wherein said touch detection procedure is selected from a group consisting of self-capacitor touch detection procedure and mutual-capacitor touch detection procedure.

8. The touch display device having auxiliary capacitor as disclosed in claim 5, wherein when said touch detection unit performs said touch detection procedure, at least one pair of said switch elements will be switched on to disable at least one of said at least one touch operation area.

9. A touch display device having auxiliary capacitor, comprising:

at least one touch operation area, each having two opposing substrates for providing at least one touch surface, wherein, a first transistor, a first electrode, a first conductive line coupled with said first electrode, a second electrode, a second conductive line coupled with said second electrode, an auxiliary capacitor, a display layer neighboring both said first electrode and said second electrode, and a second transistor are located between said two opposing substrates, wherein said first transistor has a gate for coupling with a gate driving signal, a drain for coupling with a display driving signal and a touch signal, and a source for coupling with said first electrode; said second transistor has a gate for coupling with a switch signal, a drain for coupling with said second electrode, and a source for coupling with a ground; and said auxiliary capacitor is coupled between said first electrode and said second electrode;

a display driver unit for generating said gate driving signal and said display driving signal; and a touch detection unit for generating said switch signal and said touch signal, wherein, when said touch detection unit performs a touch detection procedure, said switch signal for at least one of said at least one touch operation area will exhibit a switch-off voltage to switch off said second transistor thereof.

10. The touch display device having auxiliary capacitor as disclosed in claim 9, wherein said drain of said first transistor is coupled with said display driving signal and said touch signal via a switch element.

11. The touch display device having auxiliary capacitor as disclosed in claim 9, wherein said drain of said first transistor is coupled with a data line auxiliary capacitor.

12. The touch display device having auxiliary capacitor as disclosed in claim 9, wherein said display layer is selected from a group consisting of OLED display layer, PLED display layer, liquid crystal display layer, and electronic paper display layer, and said display layer is located below said first electrode and above said second electrode, or above both said first electrode and said second electrode.

13. The touch display device having auxiliary capacitor as disclosed in claim 9, wherein said touch detection procedure is selected from a group consisting of self-capacitor touch detection procedure and mutual-capacitor touch detection procedure.

14. The touch display device having auxiliary capacitor as disclosed in claim 9, wherein when said touch detection unit performs said touch detection procedure, said second transistor of at least one of said at least one touch operation area will be switched on to disable a touch operation area thereof.

* * * * *